fig.1 fig. 4 fig.5 fig.6b fig. 7

United States Patent Office 3,661,760
Patented May 9, 1972

3,661,760
CATHODE SPUTTERING APPARATUS FOR THE DEPOSITION OF COMPOSITE THIN FILMS
Roland Borgne, Jean Joly, and Edouard Rosiaux, Paris, France, assignors to Societe Lignes Telegraphiques et Telephoniques, Paris, France
Filed Dec. 6, 1968, Ser. No. 781,772
Int. Cl. C23c 15/00
U.S. Cl. 204—298
1 Claim

ABSTRACT OF THE DISCLOSURE

Cathode sputtering apparatus permitting:

Simultaneously or sequentially depositing an alternate or non-alternate layer of homogeneous or heterogeneous composition on a large number of substrates without breaking the vacuum, in the course of a single cathode sputtering operation;

Adjusting the distance and the orientation of centrally located targets;

Disposing the substrates on an object holder rotating continuously about the targets;

Carrying out the thickness monitoring measurements of the deposits outside the zones of circulation of the beams of charged particles, in the course of the deposition;

Eliminating any rotating joint in the construction of the apparatus;

Automating the manufacture.

PRIOR ART

The present invention concerns apparatus intended for the production of microcircuits by cathode sputtering technique which is known per se. Many publications have already dealt with the production of thin films by this process. Amongst others reference can be made to the article by Mr. J. Pompei which appeared in "l'Onde Electrique," No. 453, December 1965 (pp. 1287 ff), entitled "La Pulvérisation Cathodique—Ses Mécanismes, sa Mise en Oeuvre et ses Applications Originales Dans le Domaine des Couches Minces," and the article by Messrs. J. W. Nickerson & R. Moseson which appeared in the revue "Le Vide," November, December 1965, No. 120 (pp. 437 ff), entitled "Applications de la Pulvérisation à Basse Energie à la Préparation de Couches Minces."

BACKGROUND OF THE INVENTION

The object of the present invention is to industrialise the cathode sputtering process. To this end, efforts have been made to increase the yield of the deposition step and the quality of the parts obtained, through practical arrangements permitting the treatment in a uniform and reproducible manner of a large number of substrates in the course of a single operation, regardless of the nature of said film. The apparatus according to the present invention may be employed to produce either homogeneous films or sandwiches of complex layers.

For this purpose, a cathode sputtering apparatus which has the following essential features has been designed and built:

Pivotally mounted and orientable multiple targets which cover a wider area than is occupied by the substrates, grouped at the centre of the apparatus and adpted to be energised either successively or simultaneously in part or as a whole;

An arrangement of the substrates on interchangeable movable crowns carriages which surround the space occupied by the sources;

A ball bearing supporting the movable crown having a track with a V-shaped groove;

A precise resistance-measuring device for carrying out multiple tests during the operation, outside the beams of charged particles;

Electromechanical or electromagnetic systems for controlling and driving the movable members situated within the vacuum chamber;

Means for continuously rotating the substrates around the sources at a preset and adjustable uniform speed;

An arrangement of all the electrical connections and inlets in the stationary base of the apparatus.

The apparatus according to the present invention afford the following advantages over prior art designs:

The pivotal mounting and possibility of orienting the targets reduce the dispersion in thickness of the layers by increasing the concentration of the beams of the sputtered particles and the uniformity and density of these beams. The arrangement of the targets at the centre of the apparatus and of the substrates on the periphery makes it possible to design apparatus for simultaneous processing of a large number of substrates with minimum overall dimensions. The use of targets of different nature makes it possible to produce films of complex composition or of the sandwich type on all the substrates treated in the course of a common operation, without breaking the vacuum. In addition to the considerable saving of time thus obtained, the quality is greatly improved, since successive depositions are carried out in the same vacuum chamber which avoids the pollution and oxidation risks encountered in dependent operations. In the case of films of homogeneous composition, superposed deposits of layers of reduced thickness increase the homogeneity of the resulting film and hence the yield. All the substrates receive an identical deposit under equal conditions, whereby the advantage is obtained that the production is rendered more uniform. The applicants have observed that the reproducibility of the film thickness is within ±5%.

The interchangeability of the movable substrate carrier enables one apparatus to receive a number of such crowns successively. This arrangement makes mass production easier, by reducing idle time.

Adjusting, the speed of rotation of the substrates, sets up the number of runs. The idle times between the exposures of the substrates to the target beam may be utilised to allow a chemical reaction between the deposit and the atmosphere within the chamber (nitriding, oxidation, carburizing, etc.).

The provision of a specially designed ball bearing track which avoids any seizure due to thermal expansion, makes it possible to actuate the movable crown with a uniform rotation.

The dynamic method of performing the tests enhances precision of the measurements up to about 3% and affords the possibility of automating the manufacture in accordance with a predetermined programme, by providing a precise electronic control apparatus for the sputtering apparatus.

Electromagnetic control and driving of the moving parts eliminates any rotating coupling or joint which, in association with the provision of all the electrical inputs and connections in the stationary base, reduces the number of possible causes of leakage.

DETAILED DESCRIPTION OF THE INVENTION

The invention will be more readily understood with reference to the following description and to the accompanying figures, which are given as a non-limiting illustration of the invention in which.

The apparatus, which is of generally cylindrical shape comprises essentially five parts, namely a base, a central target-support column, a movable substrate-support crown and a vacuum chamber (all these parts being made of amagnetic materials), and a magnetic coil, as will hereinafter be described. They may be mounted on a frame supporting the vacuum pumps and the appropriate external electric supply sources, the latter elements only being mentioned here to refresh the memory.

The description, which is made, relates to an apparatus provided with only two electron sources, two targets and two target shutters. However, these values have no limiting character. Indeed, the apparatus may comprise a higher number of sources, targets and shutters. The number of such elements has been voluntarily reduced to simplify the reading of the drawings.

Figure 1:
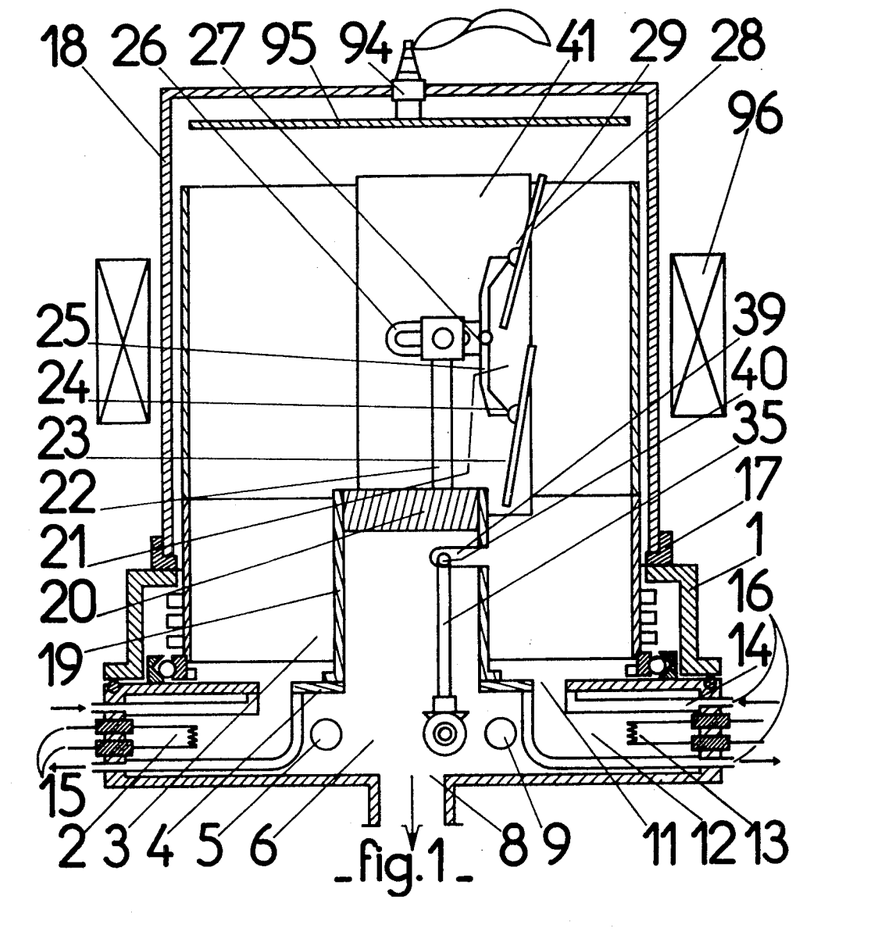
FIG. 1 illustrates a vertical section through a first embodiment of the apparatus along the plane A–A′ of FIG. 3.
Figure 2:
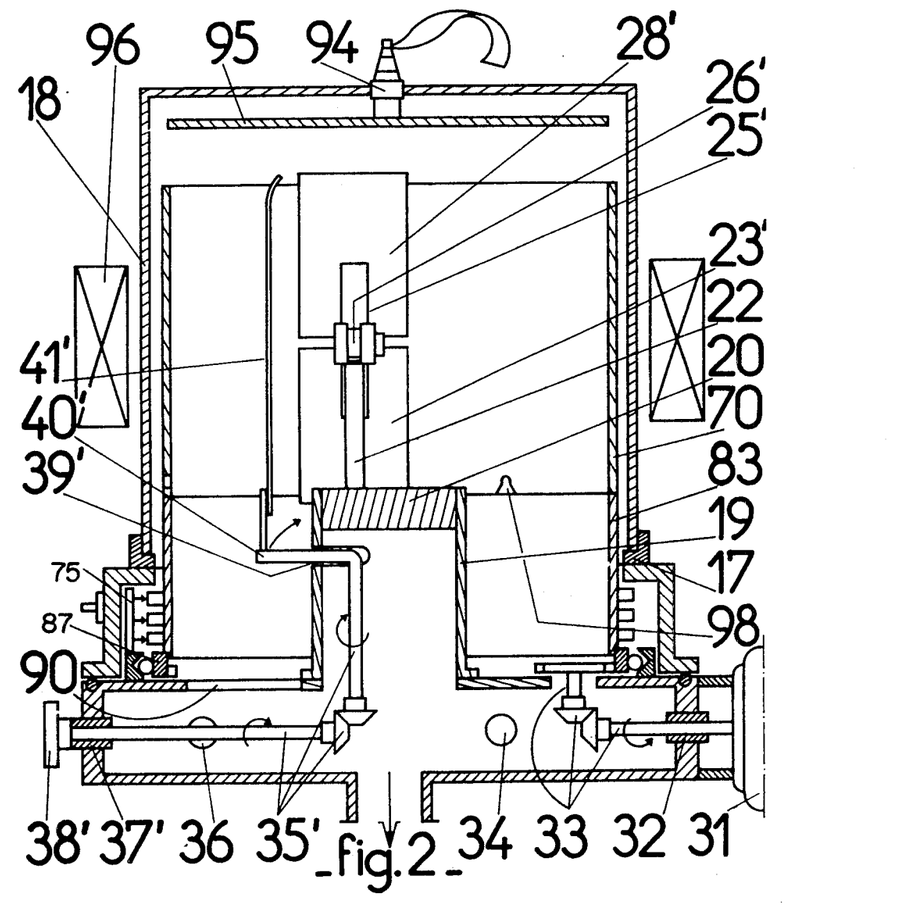
FIG. 2 illustrates another vertical section through the same apparatus along the plane B–B′ of FIG. 3.

The base 1 (FIG. 1) comprises an upper compartment 3 and a lower central compartment 6, which are separated by wall 4. From the bottom of the lower compartment runs the outlet 8 of the pumping duct. The lower rim of the vacuum chamber 18 presses on joint 17 tight with the upper compartment. The lower compartment houses two diametrally opposed electron sources 2 and 13. The filament 13 is located in an enclosure 12 opening into an orifice 11 in the wall 4 of compartment 3. The vertical wall of the lower compartment supports bushings 15 for the supply of the filaments 2 and 13. Water inlets and outlets 16 are also provided to feed the cooling jacket 14. The base lower compartment houses the driving means for the movable substrate carrier and the control means for the retractable shutters for masking the targets. The driving means for the movable carriers are better shown in (FIG. 2). It includes an external electric motor 31 connected through a vacuum tight joint 32 to a set of gears and shafts 33 which transmits the movement to the movable crowns 83, and 70 imparts thereto a uniform and adjustable speed of rotation of 5 to 20 r.p.m. The control means for each retractable shutters 41' comprise (FIGS. 1, 2 and 3) an external control button 38 and 38', a vacuum-tight joint 37 and 37' and a set of shafts and gears 35 and 35' rotating the pivot 40 and 40' in a horizontal plane and permitting individual masking and unmasking of the two targets of the apparatus.

The lower compartment of the base comprises also (FIG. 3) controllable valves such as 9 and 36 for the admission of the gases into the vessel, and also vacuum-tight feed-through such as 5 and 34 for the potential and current supply leads.

Figure 3:
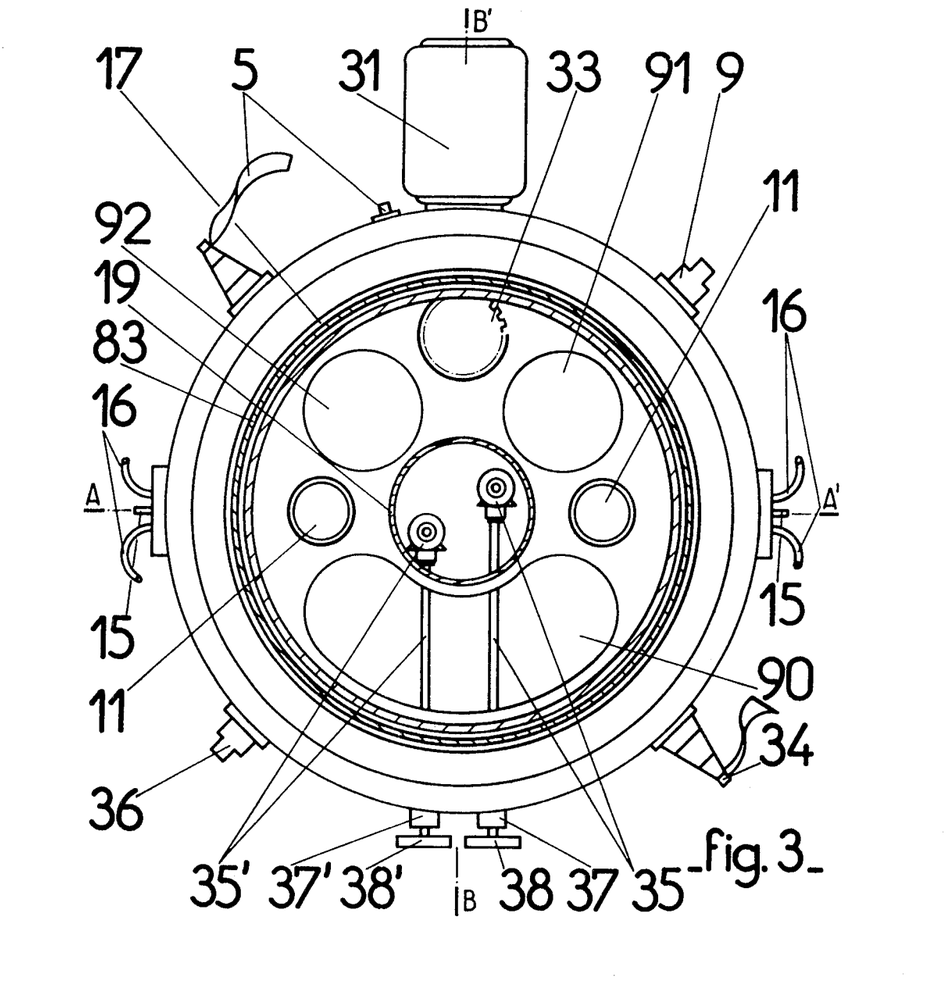
FIG. 3 illustrates the same apparatus in a horizontal section taken at the level of the upper face of the base.

In order to permit balancing of the pressures within the apparatus and a free circulation of the gases, wall 4 is formed with apertures such as those shown at 90, 91, 92, in FIG. 3. Electrical insulation is provided between the lower and upper compartments as shown in the detailed FIG. 4, such detail are omitted from the general views of FIGS. 1, 2, 3. The wall of the lower compartment 4 comprise two parts which are joined by the massive annular joint 79. The inner part of the compartment carries high voltage insulated leads for the targets.

Figure 6A:
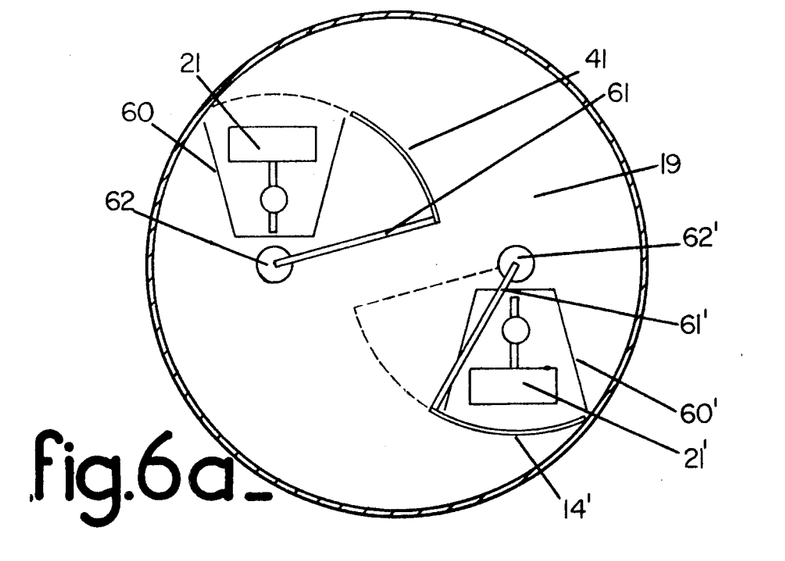
FIG. 6 illustrates an electromagnetic system for controlling the target shutters.

The wall 4 (FIGS. 1 and 2) carries the central column 19, which supports the targets 21-21' and the shutters 41-41' (FIG. 6a).

Access and change of the targets (FIGS. 1 and 2), are easy owing to an articulated maint comprising orientable vertical supports 22 and 22' rotatably connected to an insulating block 20 fast with the central column. In order that the dispersion in thickness of the film may be reduced and excessive wear-off of the bottom of the targets may be avoided, the following arrangements are made: the targets cover a wider area than that of the movable substrate-carrier crown both at the top and at the bottom. Each one consists of two flaps resp. 23 and 28, and 23' and 28', which are pivotally mounted on a U-shaped spacer 25 and 25'. Correct orientation of the flaps of the targets is obtained by turning the supports 22 and 22' around a vertical axis and pivoting the spacers about horizontal pins 27-27' and the flaps at both ends of 25-25' around pins 24-29 and 24'-29'. The spacing of the targets in relation to the substrates is adjusted by displacement (and further clamping) of the spacer-flaps subassembly in the aperture of piece 26.

In order to simplify the drawings, the electrical connections between the targets and the bias supply connectors 5 and 34 have not been shown. For the same purpose, the shields surrounding each of the targets for elimination of backward projection are omitted, and the shutters 41-41' are positioned in the masking position. They are carried by pivots 40 and 40', which turn around a vertical axis under the control of the shafts and gears 35 and 35' assembly already described. Windows 39 and 39' are provided in the central column.

The position of the targets and the position of the shields and shutters associated therewith, at the centre of the apparatus, is one of the essential features of the invention, as also is the arrangement of the substrates on the inner wall of a movable carrier crown concentric with the central column.

The movable crown is composed of two superposed cylinders 70 and 83 (FIGS. 2 and 4) which are open at both ends and are connected together as shown at 98 (FIG. 2). The upper cylinder 70 fits onto the lower cylinder 83. The pressure-locking system 98 provided at three points on the base of the cylinders directs the positioning of the upper cylinder by means of its V-shape and ensures correct relative positioning of the two cylinders. The upper cylinder may be readily disengaged by a simple upward pull. This arrangement ensures rapid mounting and removal of the upper cylinder. The lower cylinder 83 is fast with the inner ring 87 of the rolling track 87-88-77. It is driven in rotation by the driving assembly already described. The cylinder 83 also supports on its outer face circular insulators 84 bearing conductive tracks 85, cooperating with the brushes 74 fixed on brush holders 75, solid with outer stationary ring 77 in such manner as to ensure electrical contact with the rotating cylinder. A vacuum-tight cable duct 73 extends through the vertical wall of the upper compartment of the base and enables interconnection of the brushes with measuring instruments situated outside the apparatus. The substrate holders 80 inside the upper cylinder 70 maintain the substrates or the test sample such as 71 serving for in-line testing of the films. An electrical plug 72 is set into the cylinders at the level of each test sample, the female part in the upper cylinder and the male part in the lower cylinder. The female parts of these plugs are permanently connected, connecting to the test samples and the male parts to one of the conductive tracks 85 portions. Mechanical locking of the upper cylinder on the lower cylinder ensures engagement of each of said plugs without any further handling.

The substrate holders 80 (FIG. 4), made of beryllium-bronze, are permanently secured to the inner wall of the upper cylinder. Their number and therefore the number of substrates which may be treated in the course of one vacuum cycle depends only upon the ratio between the surface of the cylinder and the surface of a substrate. Parallel arrangement thereof in relation to the generatrix or axis of the cylinder in a number of superposed rows renders possible the use of targets of large surface and increases the output of the depositing operations by utilising to the maximum extent the width of the beam of the particles of the material to be deposited. These substrate holders permit simple and rapid reloading of the carriage crown. They consist of a slideway, secured to the wall of the cylinder, and delimited on each side by a guide 81 having a U-shaped profile. A spring leaf 82 is fixed at each substrate location on the slideway. The substrate, which is simply slid into the guides, is pushed forward by the spring and maintained against the protruding side of the guides. All the substrates are thus situated at the same distance from the targets and in the same position.

Figure 4:
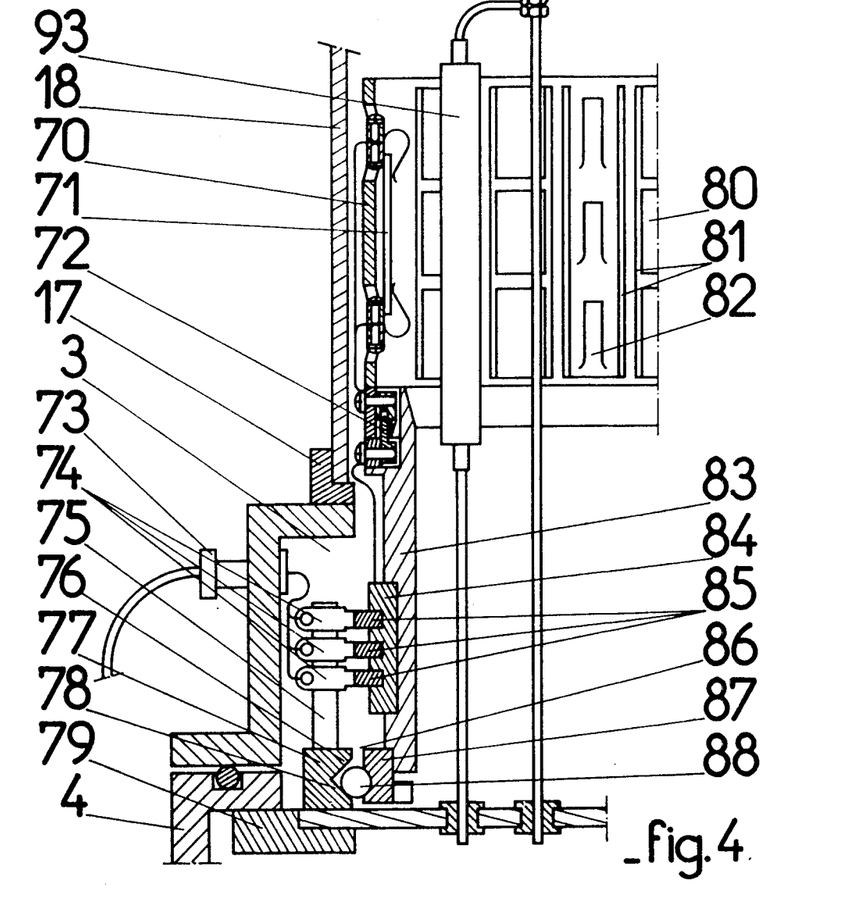
FIG. 4 is an enlarged section of a part of the base and of the movable substrate carrier.

The heating of the substrates to a temperature which may be chosen between 250° and 400° C. is effected by means of infrared radiation sources mounted on supports fixed on the wall 4. One of them, 93, is shown in FIG. 4. However, this heating method has no limiting character, and any appropriate method may be employed without modifying the nature of the invention.

The expansions produced by the high temperature of the substrates during operation, and the impossibility of employing any lubricant inside the vacuum chamber, have led the applicants to design a special rolling track 87–77 for the movable substrate carriage, which is illustrated in detail in FIG. 4. The stainless steel balls 88 of the bearing are disposed between two beryllium-bronze rings 87 and 77. The ring 87, which is secured to the base of the substrate carriage, is formed with a semicircular groove in which the balls are lodged. The stationary ring 77 is machined with a V-shaped groove forming two planar slopes 76 and 78. The balls run on the surface of the lower slope 78 and the point contact will be displaced on the slope as a function of the expansion. The clearance provided between the upper slope 76 and the balls 88 is sufficient to prevent any interference with the displacement of the balls, while preventing them from leaving the track.

Disposed over all the members just mentioned is the vacuum chamber 18, which fits into the joint 17 of the base. The said chamber (FIGS. 1 and 2) comprises at its upper end an electrical bushing 94 supporting the anode 95, which is common to all the electron beams of the apparatus, and the bias voltage supplied by an external source is applied therethrough. In another version of the apparatus, the vacuum chamber is of hemispherical form and has no bushing. This arrangement favours the vacuum-tightness of the apparatus and reduces the fragility of the chamber. In this second version, the anode common to the electron beams is supported by a rod secured to the centre of the central column and is fed by means of a bushing provided in the lower compartment of the base.

Figure 5:
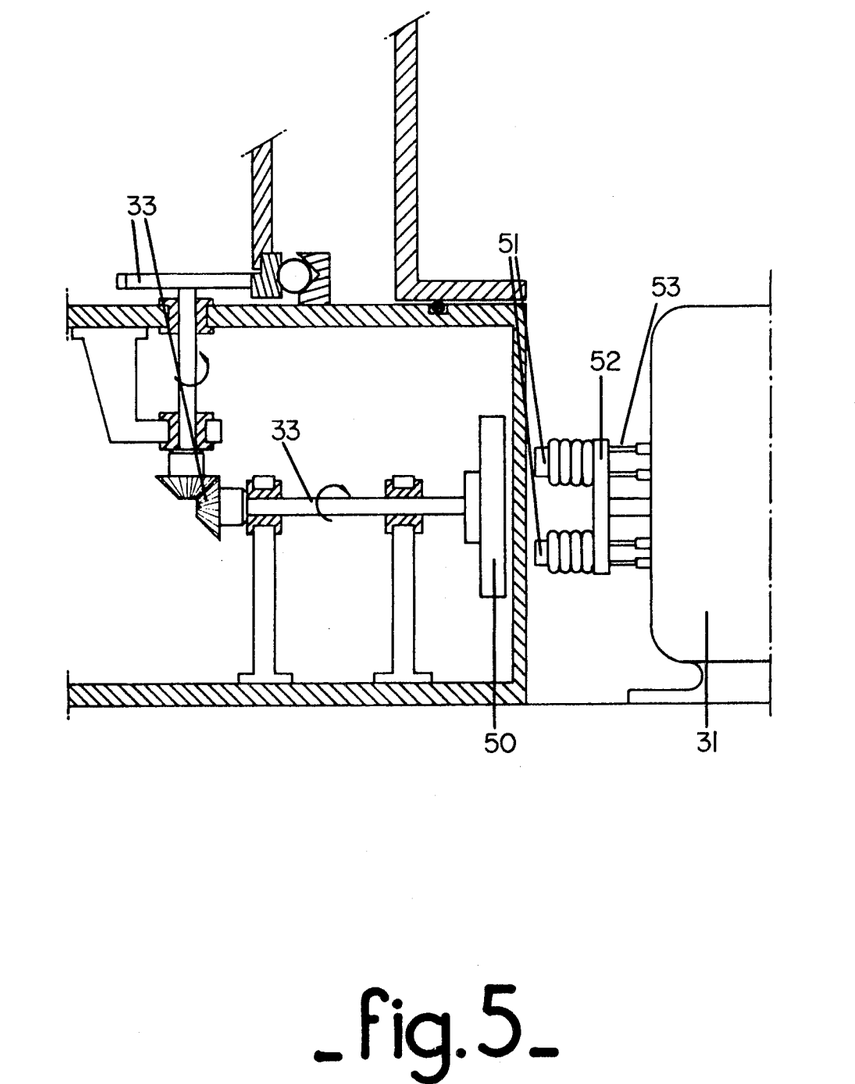
FIG. 5 illustrates an electromagnetic system for driving the movable substrate carrier.
Figure 6B:
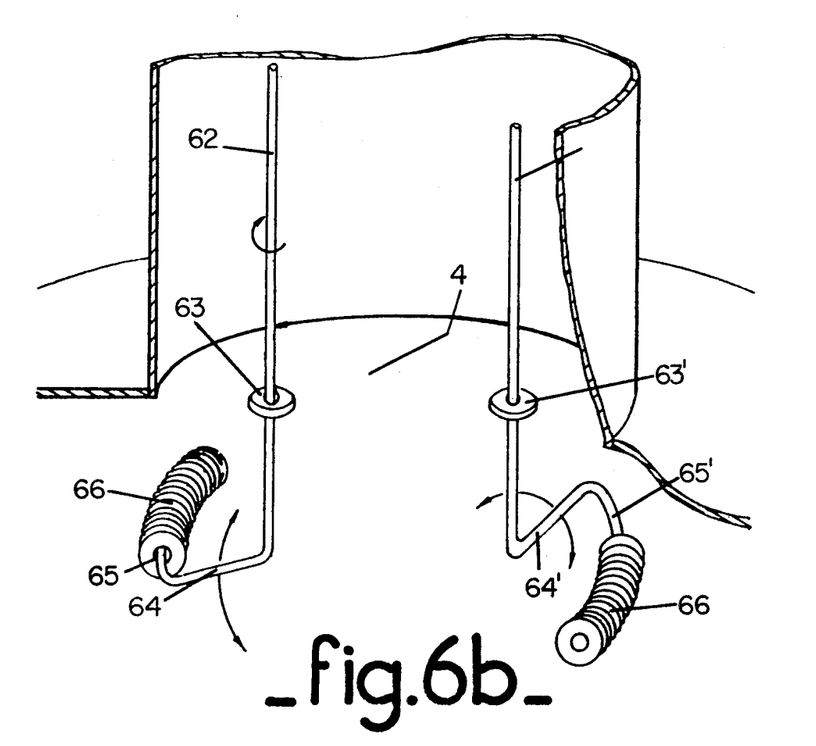

In another version of the apparatus (FIGS. 5 and 6), the joints 32 and 38 are omitted. Electromagnetic devices are employed to control the movable members situated within the vacuum chamber. The substrate carrier (FIG. 5), drive 33 is actuated by a permanent magnet 50 which is arranged to rotate around the horizontal axis. A driving plate 52 provided with solenoids 51 and rotated by the adjustable speed motor 31 is situated outside the apparatus. Coils 51 are supplied with direct current through a system of brushes contacting circular tracks 53. This mode of drive, apart from the advantages which it affords in regard to vacuum-tightness, ensures a flexible coupling between the motor and the substrate carrier, whereby the transmission of any vibrations from the motor to the substrates is obviated. The control of the retractable shutters (FIG. 6), is also an electromagnetic. FIG. 6a shows by way of example a plan view of the central column 19, above which are mounted two targets 20 and 20' provided with shields 60 and 60'. The shutters 41 and 41' are mounted on horizontal support arms 61 and 61' secured to the upper end of vertical shafts 62 and 62' which extend into the lower compartment of the base (FIG. 6b) after having passed through the wall 4 through bearings 63 and 63'. They are provided at their lower end with an arm 64 and 64' forming a lever terminated by curved permanent magnets 65 and 65', the levers and the magnets being situated in a common plane perpendicular to the vertical shaft. The permanent magnets 65 and 65' are freely movable within coils 66 and 66'. It is merely necessary to apply a unidirectional voltage to the latter to obtain the displacement of the magnet and consequently that of the shutter. The movement of the magnets and therefore that of the shutter may be controlled by reversal of the direction of the current in the coils. All the electrical connections between the reversing switches situated outside the chamber and the solenoids may be effected by the provision of a single vacuum-tight bushing in the lower compartment of the base. This apparatus has advantages in regard to vacuum-tightness and in addition is less cumbersome and easier to construct than the purely mechanical system in case of apparatus comprising a large number of targets.

The equipment of the apparatus is completed by an external magnetic coil 96 (FIG. 1), around the vacuum chamber. The magnetic coil concentrates the plasma. The electric and pressure-measuring instruments are not shown in the figures.

The operation of the apparatus according to the invention does not differ essentially from that of similar cathode projection apparatus well known to the person skilled in the art. However, this apparatus affords novel possibilities of use owing to the mechanical features adopted therein.

After the completion of a primary exhaustion, followed by a secondary exhaustion, the substrates are heated for about one hour at the appropriate temperature. When the discharge has been set up, the substrates are set in rotation. The targets are cleaned by projection onto the shutters. The operations which then follow depend upon the nature and the complexity of the deposition which it is desired to perform. For example, if the deposition is to comprise two superposed layers of different natures and of given thickness, the procedure is the following. The target which is to supply the first deposit is first unmasked and the thickness of the deposit is monitored by measuring the resistance of the test sample each time it travels past the measuring station. When the required resistance has reached the desired value, the flap is closed again, the target voltage is cut off and the heating of the cathode is stopped. The second projection, which is of different nature, may then be effected with the aid of a second target and monitored in the same way.

Figure 7:
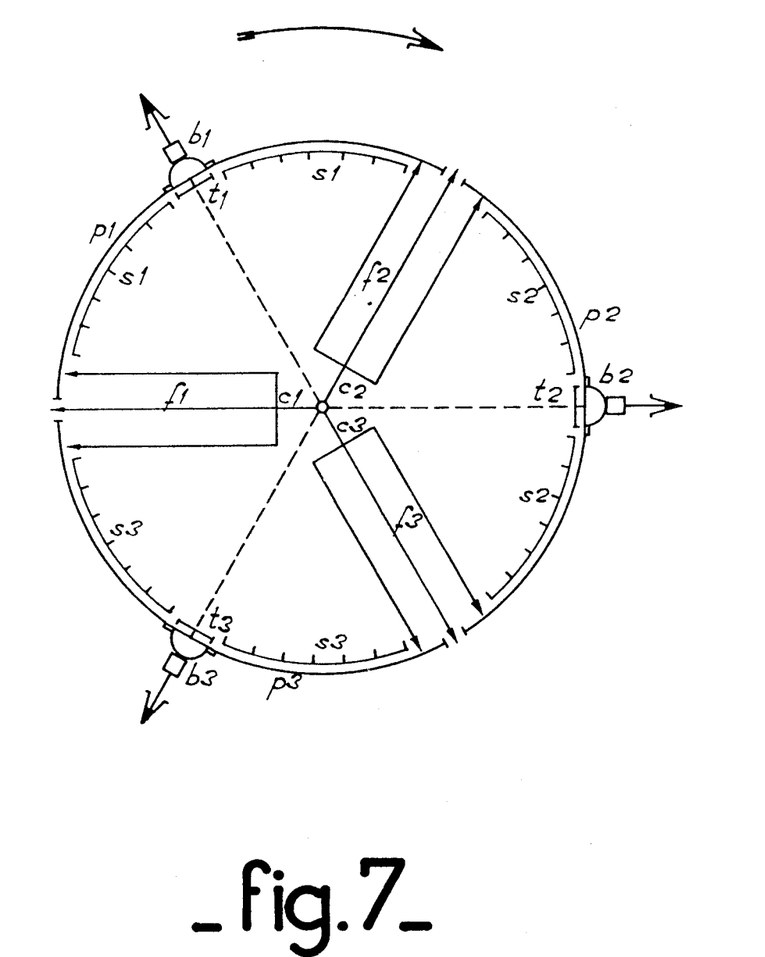
FIG. 7 diagrammatically illustrates a possible distribution of the test points.

Various modifications may be made to the apparatus, both in regard to the nature of the successive deposits, which vary, and to their constitution. By adopting appropriate means such as those illustrated in the diagram of FIG. 7, it is possible to monitor the performance of complex operations during operation (in-line testing). The number of measuring stations may be multiplied by appropriately distributing them around the substrate carrier. In an apparatus comprising three targets $C_1$, $C_2$ and $C_3$, for example, each test sample $t_1$, $t_2$, $t_3$ on the substrate carrier is connected to the female part of a connecting plug. The conductive tracks 85 (FIG. 4) are divided into as many electrically insulated sectors $p_1$, $p_2$, $p_3$ as there are test samples. Each track sector is in turn connected to the lower cylinder on the substrate carrier to the male part of a connecting plug. Under these conditions, locking of the upper cylinder establishes the connections between each test sample, such as $t_1$, and a track sector such as $p_1$. The brush holders $b_1$, $b_2$, $b_3$ are also distributed around the upper compartment of the base and shifted in relation to one another by an angle equal to that formed by the directions $f_1$, $f_2$, $f_3$ of two consecutive beams of particles. The tests are made at the time when the test samples reach the vertical of the brushes. The measurement made at a station, for example $b_1$, monitors the deposit produced by the target preceding it, for example $c_1$, on the substrates $s_1$.

After depositions, the substrates are allowed to cool and, after the exhaust equipment has been disconnected, the pressure in the chamber is restored to atmospheric pressure by admitting ultra-pure argon. A further depositing operation can then be undertaken without interruption on further substrates, simply by replacing the substrate carrier carrying the processed substrates by another, previously loaded carrier.

All the operations involved in carrying out the actual sputtering may be automated. In this type of production:

As a function of pressure and of time the primary and secondary exhausting operations, the heating of the substrates and the flushing of the chamber with argon are programmed according to time and pressure value, Set up of the discharge and the cleaning of the targets are programmed according to time and voltage and current value, Interruption of the high voltage bias on the targets and the shutters are controlled by the measurements carried on the test samples.

What we claim:

1. An apparatus for successive or alternate deposition of thin films of different materials on a plurality of substrates by sputtering in the same batch operation and for semicontinuous monitoring of the thickness of the sputtered films comprising:
   (a) a cylindrical vertically arranged vacuum chamber;
   (b) a stationary base member;
   (c) a gas tight joint mounting said chamber on said base;
   (d) an apertured plate dividing said base member into upper and lower compartments;
   (e) a centrally located column extending upwardly into said chamber from said base;
   (f) at least one pair of quadrangular targets;
   (g) articulated means on the upper end of said column for adjustably supporting said targets with respect to each other and with respect to said column;
   (h) at least one movable shutter;
   (i) means controllable from the exterior of said apparatus and extending through said column for adjustably positioning said shutter with respect to said targets;
   (j) means for removably supporting in rows and columns a plurality of substrates to be coated including a cylindrical carrier member positioned concentrically around said targets;
   (k) means to rotate said cylindrical carrier;
   (l) electron guns in said base for supplying electron beams to the annular space between said targets and said carrier member through apertures in said plate;
   (m) means in said base affording connection of a source of gas to the interior of said apparatus;
   (n) further means in said base affording connection of a vacuum pump to the interior of said apparatus;
   (o) an anode located in the uppermost part of said chamber;
   (p) a focusing coil surrounding said chamber;
   (q) means on said stationary base electrically interconnecting with said rotatable carrier member;
   (r) and monitoring means connected to said last mentioned means to measure the resistance of the deposited film on said substrates at a time when said substrates are rotated by said carrier member to positions substantially diametrically opposite said targets to yield a reading proportional to the thickness of the deposited film.

References Cited

UNITED STATES PATENTS

| | | | |
|---|---|---|---|
| 2,886,502 | 5/1959 | Holland | 204—192 |
| 3,458,426 | 7/1969 | Rausch et al. | 204—298 |
| 3,501,393 | 3/1970 | Wehner et al. | 204—298 |

HOWARD S. WILLIAMS, Primary Examiner

N. A. KAPLAN, Assistant Examiner

U.S. Cl. X.R.

204—192